(12) United States Patent
Zhang et al.

(10) Patent No.: US 12,511,322 B1
(45) Date of Patent: Dec. 30, 2025

(54) LARGE LANGUAGE MODEL-ASSISTED ENTITY NAME RESOLUTION

(71) Applicant: U.S. Bank National Association, Minneapolis, MN (US)

(72) Inventors: Chenglin Zhang, Eden Prairie, MN (US); Hun-Jeong Kang, Eagan, MN (US); Xiaoqiao Wei, Woodbury, MN (US); Wentao Lu, Minnetonka, MN (US); Christopher Kallas, Grafton, WI (US)

(73) Assignee: U.S. Bank National Association, Minneapolis, MN (US)

( * ) Notice: Subject to any disclaimer, the term of this patent is extended or adjusted under 35 U.S.C. 154(b) by 0 days.

(21) Appl. No.: 19/092,206

(22) Filed: Mar. 27, 2025

(51) Int. Cl.
*G06F 16/334* (2025.01)
*G06F 16/36* (2019.01)

(52) U.S. Cl.
CPC .......... *G06F 16/3347* (2019.01); *G06F 16/36* (2019.01)

(58) Field of Classification Search
CPC .... G06F 16/3347; G06F 16/36; G06F 16/367; G06F 16/374; G06F 16/355; G06F 16/35; G06F 16/24578; G06F 40/295; G06F 40/30; G06F 16/2237; G06F 40/40; G06F 16/3329; G06F 16/3344; G06F 16/338
See application file for complete search history.

(56) References Cited

U.S. PATENT DOCUMENTS

| | | |
|---|---|---|
| 2021/0042136 A1 | 2/2021 | Zhu et al. |
| 2021/0157835 A1 | 5/2021 | Vartakavi et al. |
| 2022/0121669 A1* | 4/2022 | Roitman ............. G06F 16/2282 |
| 2022/0269735 A1* | 8/2022 | Balasubramanian ..... G06F 8/36 |
| 2024/0303473 A1 | 9/2024 | Cheng et al. |
| 2025/0053835 A1* | 2/2025 | Stephan ................... G06N 5/04 |

FOREIGN PATENT DOCUMENTS

CN 118051648 A 5/2024

OTHER PUBLICATIONS

Hertling et al. "OLaLa: Ontology Matching with Large Language Models" Data and Web Science Group, University of Mannheim Mannheim, Germany (Year: 2023).*

(Continued)

*Primary Examiner* — Ajay M Bhatia
*Assistant Examiner* — Berhanu Mitiku
(74) *Attorney, Agent, or Firm* — Merchant & Gould P.C.

(57) ABSTRACT

Systems and methods for resolving entity names combine hybrid search techniques with large language models to improve accuracy in matching business entities. The system includes an index builder that generates and stores both sparse and dense vector embeddings representing entity information. A query component performs hybrid searches using both keyword-based and semantic methods to retrieve entity candidates from the stored embeddings. When high-confidence matches are not found, a virtual entity generator leverages large language models to generate additional entity candidates based on the input data. The system employs a re-ranker to order retrieved candidates based on their relevance to the input query. This approach enables accurate entity resolution even with noisy or incomplete input data by combining traditional search methods with advanced language model capabilities.

19 Claims, 10 Drawing Sheets

(56) References Cited

OTHER PUBLICATIONS

Riley, Matt, "Introducing Elasticsearch Relevance Engine (ESRE)—Advanced search for the AI revolution", Jun. 21, 2023, Elasticsearch Labs, obtained Jan. 16, 2025 online at: https://www.elastic.co/search-labs/blog/introducing-elasticsearch-relevance-engine-esrw, 14 pages.

Cohen, William W. et al., "A Comparison of String Metrics for Matching Names and Records", in Kdd workshop on data cleaning and object consolidation, Aug. 24, 2003, vol. 3, 6 pages.

GitHub,"jamesturk/jellyfish", a python library for doing approximate and phonetic matching of strings, obtained online on Jul. 3, 2025 at: www.github.com/jamesturk/jellyfish?tab=readme-ov-file, 4 pages.

Mikolov, Tomas et al., "Distributed Representations of Words and Phrases and their Compositionality", Advances in Neural Information Processing Systems 26, NIPS, 2013, 9 pages.

Robertson, Stephen and Zaragova, Hugo, "The Probabilistic Relevance Framework: BM25 and Beyond", Foundations and Trends in Informartion Retrieval, vol. 3, No. 4 (2009); 333-389.

Wang, Xiaohua, et al., "Searching for Best Practices in Retrieval-Augmented Generation", arXiv:2407.01219v1, Jul. 1, 2024, 22 pages.

Winkler, William E., "String Comparator Metrics and Enhanced Decision Rules in the Fellegi-Sunter Model of Record Linkage", 1990, ED 325505, Proceedings of the Section on Survey Research Methods. American Statistical Association, 9 pages.

* cited by examiner

You are an intelligent assistant tasked with identifying the official business name and address and description from a given input name. The input name may have spaces removed, be abbreviated, or truncated. Follow these steps to find the official business name:

1. Normalize the Input: Reintroduce spaces where appropriate, consider abbreviations, possible truncations, and single letter name initials. Ensure the normalized name resembles typical business name structures.

2. Search for Matches: Compare the normalized input against reliable sources such as official websites, government databases, or business directories within the United States. Prioritize sources that are authoritative and up-to-date. Do not make up any information. Please return concise result and do not provide explanations.

3. Provide the Best Match: Return the most likely official business name based on the input provided. If there are multiple matches, please return the top three most likely matches.

4. Confidence Value: Provide a confidence value for the result in the range (0.0, 1.0).

LARGE LANGUAGE MODEL-ASSISTED ENTITY NAME RESOLUTION

BACKGROUND

Entity resolution is important for systems that integrate, reconcile, or deduplicate records across disparate datasets, such as identity management platforms, master data management (MDM) systems, customer data platforms (CDPs), and fraud detection engines. Entity resolution involves identifying and matching data records that correspond to the same real-world entities, such as individuals, groups, or businesses.

SUMMARY

Aspects of the example embodiments described herein provide systems, methods, and computer program products for resolving entities from noisy or incomplete input data (e.g., noisy information) using a combination of large language models (LLMs) and advanced algorithms. The system comprises two main phases: indexing and querying.

In the indexing phase, entity information is transformed into high-dimensional embeddings using both sparse and dense vector representations, which are stored in a vector database for efficient retrieval. Sparse vector embeddings are generated using a keyword-based embedding model, focusing on keyword matching, while dense vector embeddings are generated using a semantic embedding model, capturing semantic relationships to enable more robust searches. Configurable parameters may govern embedding generation, including the treatment of stop words to enhance accuracy for short business names.

In the querying phase, the system receives a queried name and retrieves potential entity candidates from the stored sparse and dense vector embeddings using a hybrid search technique that combines both keyword-based and semantic searches. The query component is configured to perform this hybrid search based on a predetermined confidence threshold, dynamically adjusting the influence of keyword-based and semantic search scores based on entity type and performance metrics. When no high-confidence matches are found, a virtual entity generator employs an LLM to generate additional candidates based on the input data.

The virtual entity generator synthesizes attributes to refine entity identification, improving results even when input data is noisy or incomplete. An iterative synthesis process, including prompt generation, may be used to enhance the quality of virtual entity generation. Generated entities may be cross-referenced against vendor datasets for accuracy verification, and additional business details such as address, phone number, and website URL may be provided for synthesized entities.

A re-ranker evaluates and orders retrieved entity candidates based on relevance, incorporating input data similarity, historical matching performance, and external data sources. The system may select a predetermined number of candidates for further evaluation, ensuring that the most accurate and contextually appropriate results are presented.

By integrating LLMs with hybrid search techniques, virtual entity generation, and re-ranking algorithms, the example embodiments achieve enhanced accuracy, scalability, and efficiency in resolving entities, even in cases of challenging, incomplete, or inconsistent input data. Configurable parameters allow users to refine ranking criteria and candidate selection thresholds, optimizing entity resolution outcomes.

BRIEF DESCRIPTION OF THE DRAWINGS

FIG. 9 illustrates an example of a prompt according to an example embodiment.

DETAILED DESCRIPTION

Figure 1:
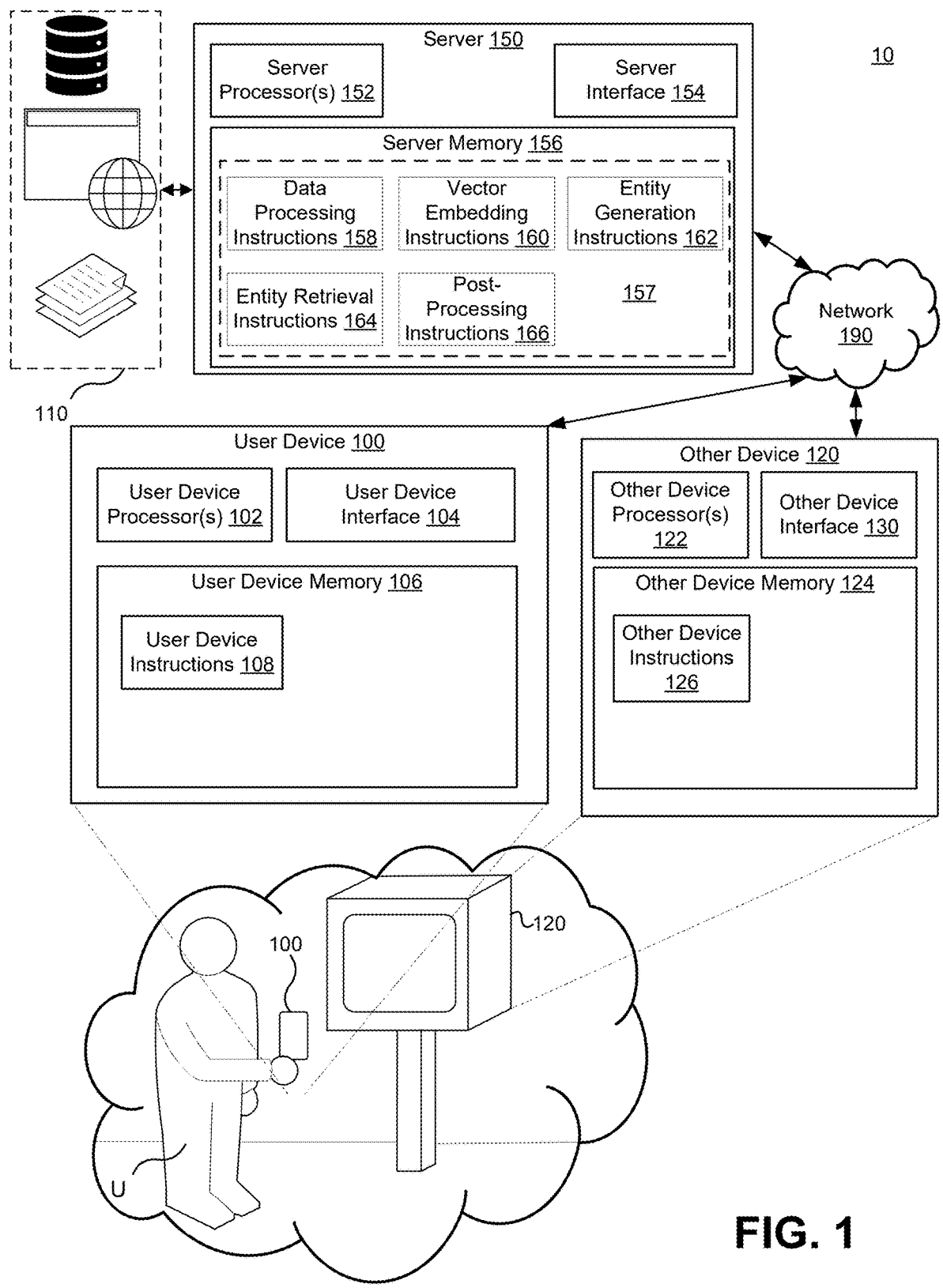
FIG. 1 illustrates an example system in which systems and methods of the present disclosure can operate to perform large language model-assisted entity name resolution.

Traditional entity resolution techniques leverage phonetic functions, edit distance metrics, and hashing algorithms to compare and determine similarities across attributes such as names, addresses, and identification numbers. However, these methods face challenges when dealing with incomplete, inconsistent, or incorrect data, particularly in contexts where entity names often exhibit variations such as misspellings, abbreviations, and differing naming conventions.

Noise in data, also referred to as noisy information, challenges traditional rule-based and pattern-matching approaches, which rely on predefined formats to identify and reconcile records. For example, in financial data processing pipelines, entity resolution is often required when reconciling payee information extracted from scanned checks or parsing transaction records with incomplete or inconsistently formatted entity names. These challenges arise due to data inconsistencies, such as variations in name formatting (e.g., "John A. Doe," "J. Doe," "Doe, John"), limited or incomplete information in transaction records, and errors introduced by OCR-based extraction (e.g., "John Doe" misread as "John Doe"). Rule-based systems, constrained by predefined patterns, struggle to account for these variations, requiring extensive manual updates to maintain accuracy and making them impractical at scale. Disclosed examples can address one or more of these issues.

In one example implementation includes two information flow phases: indexing and querying of business entities. In the indexing phase, business information is collected and stored in a vector store. This indexed information can be used to find a relevant business entity for a given query. In the querying phase, the system takes a business name, retrieves relevant entity candidates matching with a queried name, and post-processes the search results to return entity information. The system includes a business entity generation submodule that creates virtual entity information based on a queried name which might be incorrect, unofficial, or incomplete. Although this business information may contain false details, it effectively captures the relevance patterns needed for retrieval. The synergy between these components offers a robust way for enhancing the accuracy of finding a real business entity.

In the indexing phase, business entity information has been collected and transformed into a format that allows for efficient and effective search. First business entity information is collected and extracted from data sources. After the information is ingested and processed, each entity is converted into vector embeddings using advanced embedding models. To support both keyword matching and semantic search, embedding models produce two types of vectors: sparse vectors for keyword matching and dense vectors for semantic search. The sparse embeddings can be used in precise term matching and the dense embeddings represent the semantic content of the text in a high-dimensional space, capturing the semantic relationships and similarities between different pieces of information. The generated embeddings are then stored in a vector store. Indexed embeddings allow the system to handle large volumes of high-dimensional data, enabling rapid and precise querying.

The querying module of the system retrieves entities corresponding to a given name by using hybrid search techniques. The hybrid entity search can retrieve the most relevant information by combining a keyword-based search and a semantic search. A traditional keyword-based search is rooted in precise term matching but is vulnerable to typos and synonyms. But semantic search tries to comprehend the intent and context of the user's query and the content of the documents being searched. From the vector encoding's perspective, a keyword-based search utilizes sparse vectors, and a semantic search uses dense vectors. The hybrid search leverages both sparse vectors (focused on keyword relevance) and dense vectors (capturing broader context and meaning) to provide more accurate and insightful search results. This approach ensures that even if there are typos or synonyms, the search can still understand the user's intent and deliver relevant results. Query information can be, for example, a given business name or entity information generated by a large language model. The query information is encoded into embedding vectors representing the information in a high-dimensional space. These vectors are used to identify a neighborhood in the entity embedding space, where similar real entities are located based on vector similarity.

Definitions

A "chatbot" as used in this disclosure is a type of conversational agent that primarily interacts with users through text-based or voice-based chat interfaces. Chatbots can be rule-based (following scripted responses) or AI-driven (leveraging machine learning and natural language processing (NLP) to generate dynamic replies). They are commonly used for customer service, FAQs, and task automation. In the embodiments described herein, they are typically artificial intelligence ("AI") driven.

"Confidence threshold" as used in this disclosure generally means a predetermined numerical value (e.g., between 0.0 and 1.0) used to determine whether entity matches meet minimum similarity requirements. In example embodiments, higher values indicate greater similarity between an input name and returned candidates.

A "conversational agent" as used in this disclosure is an artificial intelligence (AI)-powered system designed to engage in human-like dialogue through text, voice, or multimodal interactions. Conversational agents can include chatbots, virtual assistants, and AI-driven customer support systems. They can, in some embodiments, leverage NLP, machine learning, and predefined rules to interpret input, generate responses, and simulate conversation.

"Dense vector" as used in this disclosure generally means a high-dimensional numerical representation of entity information that captures semantic relationships and similarities between different pieces of information, enabling semantic search capabilities.

"Entity information" as used in this disclosure generally means data associated with an entity (e.g., a business entity), including, for example, official business name, parent company name, address, phone number, website, and business identifier.

"Hybrid search" as used in this disclosure generally means a combined search methodology that utilizes both keyword-based search using sparse vectors and semantic search using dense vectors to identify relevant entity matches.

"Large language model" or "LLM" as used in this disclosure generally means an artificial intelligence system trained on vast datasets to understand and generate human-like text. Example uses of LLMs in this context include generating virtual entity candidates and normalize input data.

"Noisy information" as used in this disclosure generally refers to data that is incomplete, inconsistent, or contains errors. This could include misspelled names, truncated information, ambiguous abbreviations, or data extracted from unstructured sources (e.g., handwriting on checks or transaction memos with missing details).

"Re-ranking" as used in this disclosure generally means the process of evaluating and reordering initially retrieved entities based on their relevance to the query using unified standards and relevance metrics.

"Sparse vector" as used in this disclosure generally means a numerical representation of entity information optimized for keyword matching.

"Vector store" as used in this disclosure generally means a database system configured to store and efficiently retrieve both sparse and dense vector embeddings representing entity information.

"Virtual entity" as used in this disclosure generally means a synthesized set of entity information generated by a large language model based on input data when high-confidence matches are not found through direct database searches.

Generally, the examples disclosed herein disclose systems and methods for resolving entity names using large language models.

System Architecture

FIG. 1 illustrates an example system (10) in which systems and methods of the present disclosure can operate to perform large language model-assisted entity name resolution. The system (10) includes a user device (100), data sources (110), an other device (120), and a server (170) connected to a network (190).

The user device (100) is a device used by a user that can be used as part of processes described herein. The user device (100) can include one or more aspects described elsewhere herein such as in reference to the computing environment (1000) of FIG. 10. In many examples, the user device (100) is a personal computing device, such as a smart phone, tablet, laptop computer, or desktop computer. But the device (100) need not be so limited and may instead encompass other devices used by a user as part of processes described herein. In the illustrated example, the user device (100) can include a user device processor set (102), a user device interface set (104), and a user device memory set (106), among other components.

The user device processor set (102) is a set of one or more processors. One or more processors are components of the user device (100) that execute instructions, such as instructions that obtain data, process the data, and provide output based on the processing. The user device processor set (102) can include one or more aspects described below in relation to the processor set (1012) of FIG. 10.

The user device interface set (104) is a set of one or more interfaces, which are one or more components of the user device (100) that facilitate receiving input from and providing output to something external to the user device 100. The user device interface set (104) can include one or more aspects described below in relation to the interface set (1018) of FIG. 10.

The user device memory set (106) is a set of one or more memory components, which are components of the user device (100) configured to store instructions and data for later retrieval and use. The user device memory set (106) can include one or more aspects described below in relation to the memory (1414) of FIG. 10. As illustrated, the user device memory set (106) stores user device instructions (108) and the user device instructions (108).

The user device instructions (108) are a set of instructions that, when executed by the user device processor set (102), cause the device processor set (102) to perform an operation described herein. In examples, the instructions (112) can be those of a mobile application (e.g., that may be obtained from a mobile application store, such as the APPLE APP STORE or the GOOGLE PLAY STORE). The mobile application can provide a user interface for receiving user input from a user and acting in response thereto. The user interface can further provide output to the user. In some examples, the client instructions (108) are instructions that cause a web browser of the user device (100) to render a web page associated with a process described herein. The web page may present information to the user and be configured to receive input from the user and take actions in response thereto.

The other device (120) is, in some embodiments, a device that executes instructions and processes data as part of the entity resolution system to operate as a conversational agent or chatbot. In the illustrated example, the other device (120) includes an other device processor set (122), an other device memory set (124), and an other device interface set (130).

The other device processor set (122) is a set of one or more components of the other device (120) that execute instructions, such as instructions that obtain data, process the data, and provide output based on the processing. The device processor set (122) can include one or more aspects described below in relation to the processor set (1012) of FIG. 10.

The other device memory set (124) is a set of one or more components of the other device (120) configured to store instructions and data for later retrieval and use. The other device memory set (124) can include one or more aspects described below in relation to the memory (1014) of FIG. 10. The other device memory (124) can store other device instructions (126).

The other device instructions (126) are a set of instructions that, when executed by the processor set (122), cause the processor set (122) to perform one or more operations described elsewhere herein.

The other device interface set (130) are one or more components of the other device (120) that facilitate receiving input from and providing output to something external to the other device (120). The one or more user other device interfaces sets (130) can include one or more aspects described below in relation to the one or more interfaces (1018) of FIG. 10.

The server (150) is a server device that functions as part of one or more processes described herein. In the illustrated example, the server (150) includes a server processor set (152), a server interface set (154), and a server memory set (156), among other components.

The server processor set (152) is a set of one or more processors that are components of the server (150) that execute instructions, such as instructions that obtain data, process the data, and provide output based on the processing. The server processor set (152) can include one or more aspects described below in relation to the processor set (1012) of FIG. 10.

The server interface set (154) is a set of one or more components of the server (150) that facilitate receiving input from and providing output to something external to the server (150). The server interface set (154) can include one or more aspects described below in relation to the one or more interfaces (1018) of FIG. 10.

The server memory set (156) is a collection of one or more components of the server (150) configured to store instructions and data for later retrieval and use. The server memory set (156) can include one or more aspects described below in relation to the memory (1014) of FIG. 10. The server memory set (156) can store server instructions (157).

The server instructions (157) are instructions that, when executed by one or more processors of the server processor set (152), cause the server processor set (152) to perform one or more operations described herein. In an example embodiment, the server memory set (156) stores server instructions (157) that comprise multiple specialized instruction components for entity resolution processing. When executed by the server processor set (152), these instruction components work together as described herein. In an example implementation, the server instructions include: data processing instructions (158) for extracting and structure business entity information, vector embedding instructions (160) for generating both sparse and dense vector embeddings representing entity information. The sparse vectors are generated using keyword-based embedding models for precise term matching, while dense vectors are generated using semantic embedding models to capture contextual relationships.

Server instructions (157), in some embodiments, also include entity generation instructions (162) for creating virtual entity candidates when high-confidence matches are not found during initial searches. The entity generation instructions (162) utilize large language models for synthesizing potential entity matches based on the input data, accounting for variations in naming conventions, abbreviations, and truncations.

In an example implementation, a natural language processing (NLP) model of a virtual entity generator implements specialized text normalization capabilities specifically designed for business name processing:

Detection and expansion of common business abbreviations (e.g., "Corp.", "Inc.", "LLC") through a learned understanding of abbreviation patterns, derived from a large set of training datasets, or optionally a specific predefined dictionary. Additionally, users can specify this knowledge through prompts if needed.

Identification and proper handling of single-letter initials in business names (e.g., "P. J. Ganrom", "T. A. Kearjon") using trained pattern recognition Analysis of truncated business names through contextual understanding of industry-specific naming conventions Restoration of proper spacing and capitalization based on learned business name formatting rules.

Correction of common typographical errors using edit distance calculations and business name-specific error patterns Although in some examples there may be a dictionary, there need not be a specific dictionary in the system. A LLM may already learn abbreviation knowledge from a large set of datasets while being trained or fine-tuned. In addition, or instead, a prompter can specify a dictionary via one or more prompts provided to a LLM.

The NLP model is configured with domain-specific rules and training data focused on business entity names across different industries and regions.

Server instructions (157), in some embodiments, also include entity retrieval instructions (164) for performing hybrid searches across both sparse and dense vector embeddings stored in vector databases. These instructions implement a combined keyword-based and semantic search approach, comparing input queries against stored business entities.

Server instructions (157), in some embodiments, also include post-processing instructions (166) for refining and ranking the retrieved entity matches. These instructions evaluate match confidence scores against predetermined thresholds (e.g., between 0.85 and 0.95) and implement re-ranking algorithms to order results based on relevance to the input data.

The instruction components interact through a coordinated workflow described herein. This integrated instruction architecture enables efficient parallel processing and optimized vector operations for handling large-scale entity resolution tasks.

The network (190) is a set of devices that facilitate communication from a sender to a destination, such as by implementing communication protocols. Example networks (190) include local area networks, wide area networks, intranets, or the Internet.

In some examples, the system (10) can implement an entity resolution pipeline. For instance, the server (150) may execute instructions that cause the server to run the pipeline. The user device (100) or the other device (120) may send information to the server (150) that is processed using the pipeline. An example pipeline is shown in and described in relation to FIG. 2.

Entity Resolution Pipeline

Figure 2:
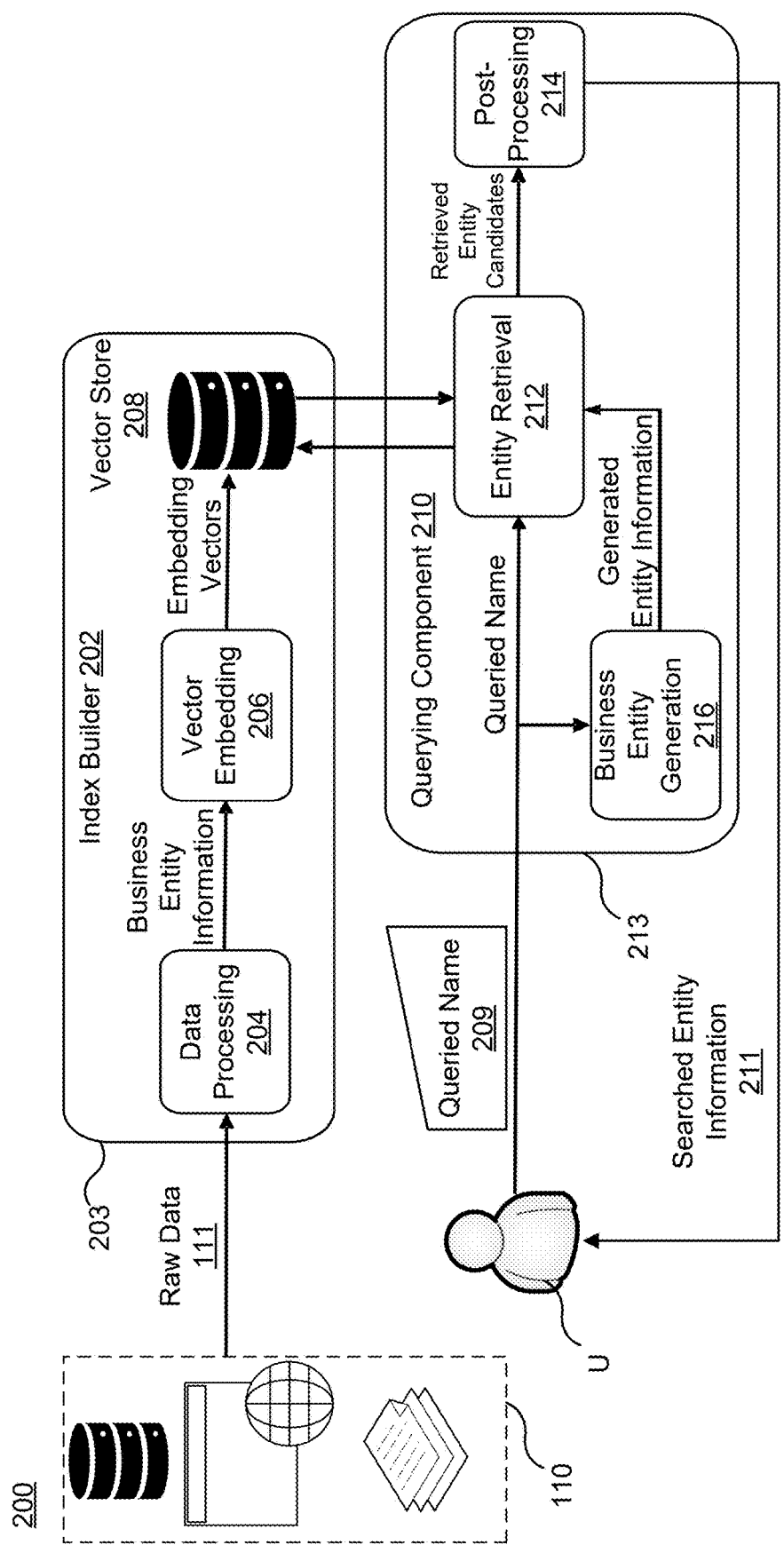
FIG. 2 illustrates an entity resolution pipeline according to an example embodiment.

FIG. 2 illustrates an entity resolution pipeline (200) according to an example embodiment. The entity resolution pipeline (200) includes two main phases: an indexing phase (203) and a querying phase (213). An index builder (202) is configured to perform the indexing phase (203). The indexing phase (203) begins with raw data (111) which is processed through data processing (204) to extract and structure business entity information. The data processing component processes data collected from authoritative sources such as global intelligence databases, extracting fields including official business names, parent companies, addresses, phone numbers, websites, and business identifiers.

The processed business entity information undergoes vector embedding (206) to generate embedding vectors that enable efficient searching and matching within the embedding space. In some examples, the embedding is performed using existing embedding techniques and models (e.g., ALL-MPNET-BASE-V2 by MICROSOFT RESEARCH or GEMMA EMBEDDINGS by GOOGLE) or using fine-tuned embedding models that are specifically customized for entity name resolution tasks. The vector embedding component generates two types of vectors:

Sparse vectors using keyword-based embedding models for precise term matching

Dense vectors using semantic embedding models to capture contextual relationships These embedding vectors are stored in a vector store (208) that enables rapid and precise querying of the high-dimensional vector data.

A querying component (210) is configured to perform the querying phase (213). As shown in FIG. 2, the querying phase (213) begins with a queried name (209) input to the system. An entity retrieval component (212) performs hybrid searches combining both keyword-based and semantic search methods to identify potential matches from the vector store (208).

When high-confidence matches are not found (e.g., the nearest matches are further away than a threshold distance, such as calculated using cosine similarity or other techniques), the business entity generation component (216) creates virtual entity candidates using one or more large language models to handle variations in naming conventions, abbreviations, and truncations. The generated entity information is then used for additional search iterations.

The post-processing component (214) refines and ranks the retrieved entities using confidence scores and re-ranking algorithms to determine the final searched entity Information. The system uses predetermined confidence thresholds (e.g., between 0.85 and 0.95) to ensure high-quality matches.

In some embodiments, confidence threshold values are determined through extensive experimental testing and operational validation. The optimization process involves analyzing multiple entity resolution cases across two test datasets: one containing records with known correct matches and another consisting of records that challenged existing systems.

A systematic evaluation of threshold values is conducted, beginning with broad-range testing within a predetermined range (e.g., 0.5 to 1.0) to establish baseline performance. This is followed by refined testing within a narrower range (e.g., 0.80 to 0.99) using predetermined increments (e.g., 0.01). At each threshold level, performance metrics such as precision, recall, and accuracy are tracked to assess effectiveness.

Operational validation is performed by processing real-world transaction data, including ACH and wire transfers, and analyzing matching performance across various business name patterns, such as abbreviations, truncations, and noisy inputs. Further verification is conducted against authoritative business databases, including those maintained by Dun & Bradstreet (D&B) and S&P Global Intelligence.

The results demonstrate that optimal performance is achieved within a predetermined range (e.g., 0.85 to 0.95). Thresholds set below this range (e.g., below 0.85) result in excessive false positives, while thresholds above this range (e.g., exceeding 0.95) become overly restrictive and fail to identify valid matches. A threshold around 0.90 provides the best balance of precision and recall for typical use cases.

The system allows for threshold adjustments within this experimentally validated range to accommodate specific business requirements while ensuring reliable matching performance. Ongoing monitoring and periodic revalidation help maintain optimal thresholds as new entity resolution cases arise.

The entity resolution pipeline (200) enables efficient parallel processing and optimized vector operations for handling large-scale entity resolution tasks across databases containing business entities.

Figure 3:
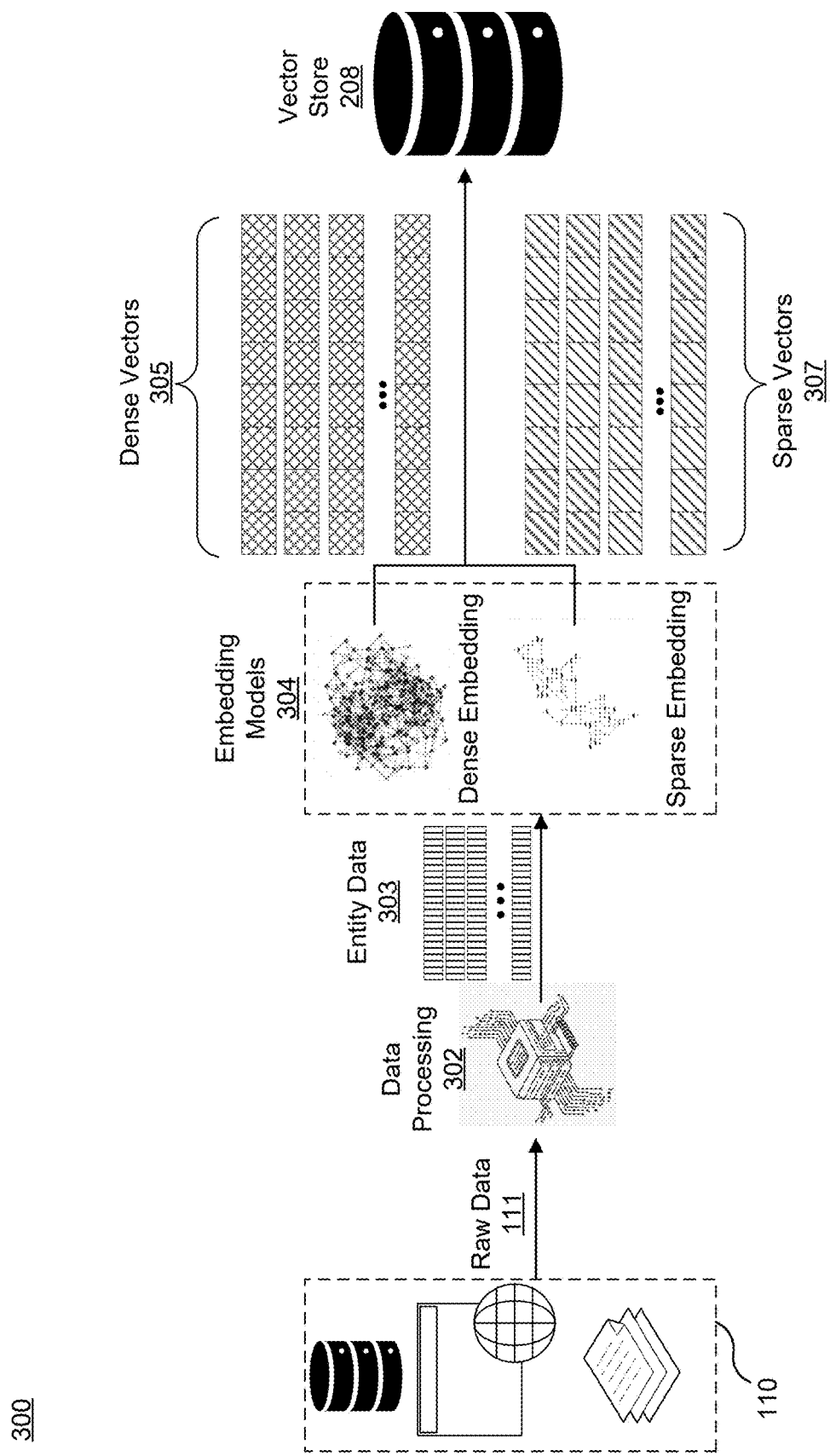
FIG. 3 illustrates an indexing architecture for performing an indexing phase of a entity resolution pipeline, according to an example embodiment

FIG. 3 illustrates an indexing architecture (300) for performing an indexing phase of an entity resolution pipeline, according to an example embodiment. As shown in FIG. 3, the indexing architecture (300) of the entity resolution pipeline includes several components working together to extract, process, and resolve business entity information.

The indexing phase process begins with data collection and processing (302) performed by a data processor, which gathers raw data (111) such as business entity data collected from various data sources (110) such as Dun & Bradstreet (D&B) and S&P Global Intelligence databases. This collected entity data (303) is then processed to extract relevant business entity information for subsequent stages.

Once the entity data (303) is processed, a vector embedding generation component converts each entity into vector embeddings using advanced embedding models. The embedding models used can be general purpose or configured (e.g., fine-tuned) with domain-specific rules and training data focused on business entity names across different industries and regions (e.g., regions of interest). These models can each be configured to generate two types of vectors or each be con figured to generate one of: sparse vectors (307) for precise keyword matching and dense vectors (305) for semantic search. The sparse vectors (307) are vectors that are optimized for keyword-based matching, while the dense vectors (305) are designed to capture the relationships between entities in a high-dimensional space, enabling semantic search capabilities.

The generated vectors, namely the sparse vectors (307) and the dense vectors (305) are, in turn, stored in vector store (208).

Figure 4:
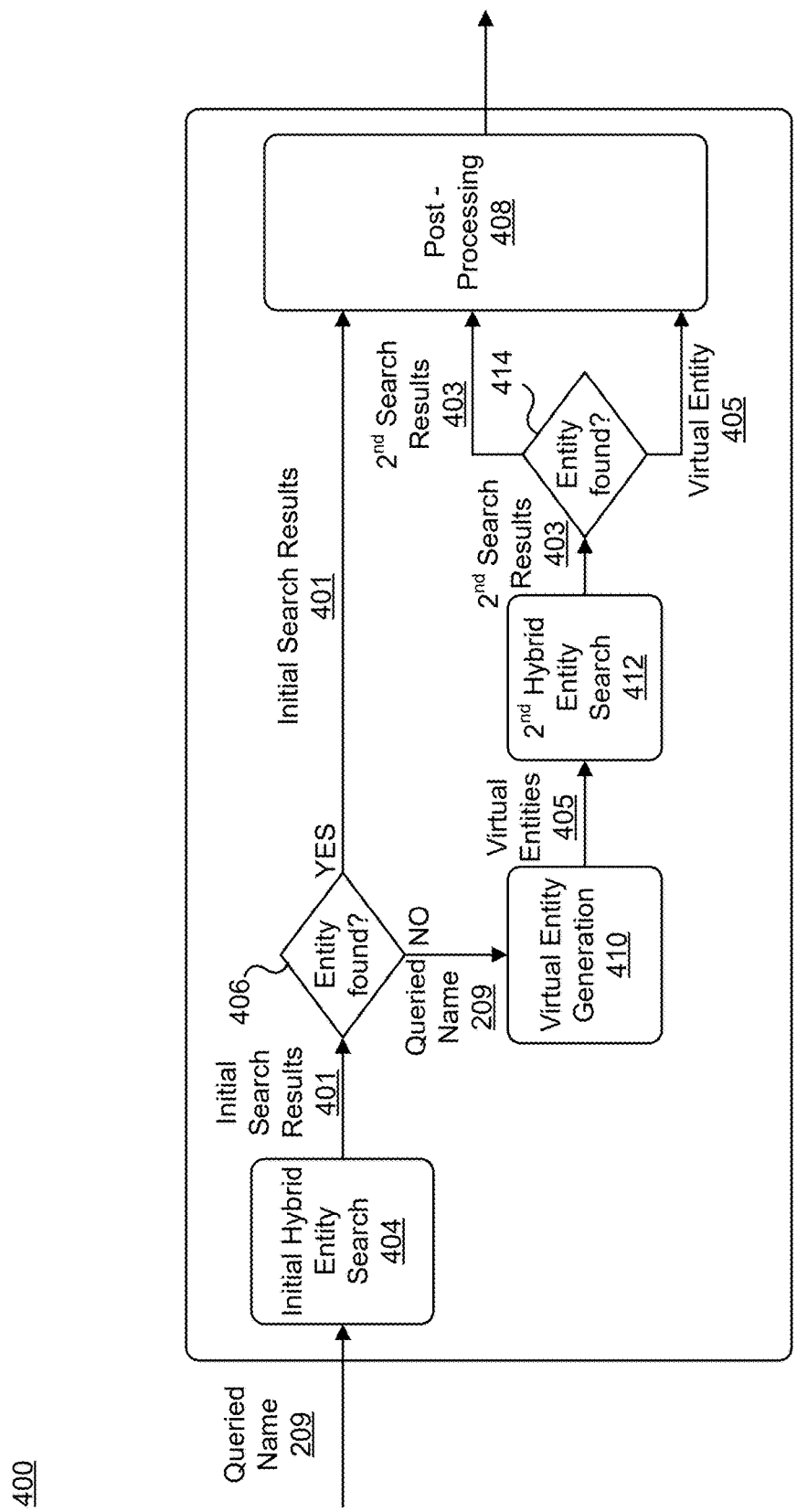
FIG. 4 illustrates a querying architecture for performing a querying phase of an entity resolution pipeline according to an example embodiment.

FIG. 4 illustrates a querying architecture (400) for performing a querying phase of an entity resolution pipeline according to an example embodiment.

More particularly, FIG. 4 shows how the system processes a queried name (209) through multiple steps to find matching entities.

The system can receive the queried name (209) input. With the queried name (209) input, the system first performs an initial hybrid entity search (404). As explained herein, in some embodiments, the system performs the hybrid entity search (initial) using both sparse and dense vector embeddings stored in a vector store. The initial hybrid entity search (404), in some embodiments, combines keyword-based and semantic search methods to retrieve potential entity matches.

If this initial search performed by the initial hybrid entity search (404) finds entities with confidence scores above a predetermined threshold, the system returns the initial search results (401), as shown by initial search determination (406) ("YES"). In an example implementation, the initial search results (401) are provided to a post-processor that performs post-processing (408). A non-limiting example threshold is 0.9.

If the initial search determination (406) determines that no entities are found with sufficient confidence ("NO"), the querying architecture (400) activates its business entity generation module (410).

In some embodiments, when the querying architecture (400) receives a queried name (209), this name might be incorrect, unofficial, or incomplete. In such a case, it is hard to find a business entity exactly matching only with the given name. To resolve this issue, the business entity generation module (410) of the querying architecture (400) utilizes the power of a large language model (LLM). Large Language Models are sophisticated AI systems designed to understand and generate human-like text by leveraging vast datasets. These models operate by analyzing patterns in the data they are trained on, allowing them to predict and generate coherent results based on input prompts. With these capabilities of LLMs, the system generates so-called virtual entities (405) from a queried name (209). This information generation is designed to reflect the type of information that would be relevant to the queried name. Although the virtual entities may contain false details, they (alone or in aggregate) effectively capture the relevant information needed for retrieval. Counterintuitively, from these synthetic, virtual entities, the entity search can fetch the entity candidates that are more likely to correspond to real entities.

In some embodiments, the business entity generation module (410) uses an LLM to create one or more virtual entities (405) containing synthesized attributes (also referred to herein as "virtual entity information") corresponding to the input data (e.g., the queried name 209). The querying architecture (400) then performs a second hybrid entity search (412) using the one or more virtual entities information. Similar to the initial hybrid entity search (404), if this second hybrid entity search (412) attempt finds matches with high confidence, those second search results (403) are returned as shown by second search determination (414) ("YES"). In an example implementation, the second search results (403) are provided to a post-processing module (also referred to as a post-processing module) that performs post-processing (408). A non-limiting example threshold is 0.9.

If no high-confidence matches are found after the second hybrid entity search (412), the system returns the virtual entities (405) generated by the LLM as shown by second search determination (414) ("NO"). In an example implementation, the virtual entities (405) are provided to a post-processor that performs post-processing (408).

Finally, some or all search results go through a post-processing (408) that re-ranks the retrieved candidates based on their relevance to the input data before sending the final response back to the requestor (e.g., a user U or a requesting component).

Figure 5:
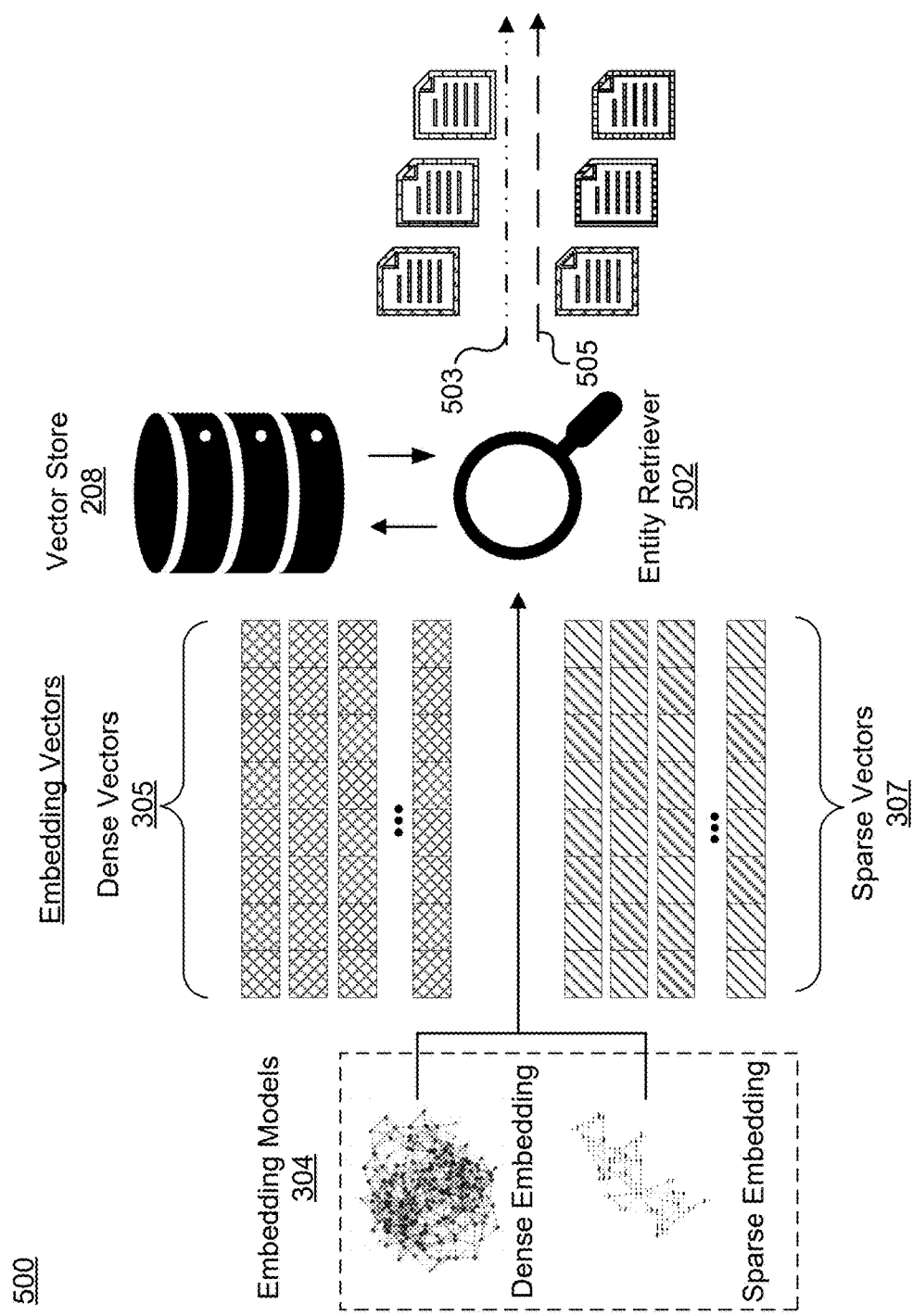
FIG. 5 illustrates the hybrid search architecture of the system according to an example embodiment.

FIG. 5 illustrates the hybrid search architecture (500) of the system according to an example embodiment. The hybrid search architecture (500) of the system combines both keyword-based and semantic search capabilities to retrieve relevant entity matches.

The system includes one or more embedding models (304) that process query information in two ways. First, a dense embedding model is used to generate dense vectors (305) that capture semantic meaning and context. Second, a sparse embedding model is used generates sparse vectors (307) for more precise keyword matching.

In some embodiments, an entity retriever (502) combines sparse and dense vector matching results using two methods. One approach calculates a weighted distance score.

Alternatively, the entity retriever (502) utilizes Reciprocal Rank Fusion (RRF) scoring to combine sparse and dense vector search results, balancing keyword precision with semantic relevance.

In some embodiments, the entity retriever (502) computes similarity scores for each candidate entity match, combining both vector types. Sparse vector similarity focuses on exact keyword matches, while dense vector similarity captures semantic relationships. These scores are then combined to produce a final relevance score.

The entity retriever (502) may implement a confidence threshold. If the combined similarity scores fall below a threshold, the system triggers additional entity generation processes to improve match quality.

This hybrid approach allows the system to leverage both keyword matching precision and semantic understanding, with configurable weighting to optimize different entity matching scenarios.

In an example implementation, the embedding vectors output from the embedding models (304) are stored in a vector store (208), which contains indexed entity information for searching. The entity retriever (502) interfaces with the vector store (208) to identify relevant entities by comparing query embeddings with stored entity vectors, processing both dense vectors (305) and sparse vectors (307).

The system uses paths (503, 505) to route dense and sparse vector information between components, with path (503) handling dense vectors and path (505) managing sparse vectors. The paths (503, 505) can take any of a variety of forms, including function return data paths, API communication paths, data pipes, other paths, or combinations thereof.

This hybrid architecture enables the system to combine keyword precision via sparse vectors and semantic understanding through dense vectors, improving accuracy and matching even with typos, synonyms, or incomplete information. Thus, an entity name resolution system implementing this hybrid architecture can have enhanced precision and fault tolerance compared to traditional techniques.

In an example implementation, the embedding models (304) generate vectors using two distinct methods: BM25 for sparse vectors (307), which supports precise keyword matching, and Word2Vec for dense vectors (305), which capture semantic meaning and relationships.

The system can be configured to preserve stop words (e.g., "a", "the", "and", "of") in sparse vectors, as they can be useful for distinguishing business entity names and enhancing search accuracy.

Both stored entity information and query information are encoded into sparse and dense vector representations for hybrid matching against the stored embeddings.

The system can support both keyword-based matching (using sparse vectors) and semantic matching (using dense vectors), with the vector store supporting efficient indexing and retrieval of both types.

The vector store (208) can support fast indexing and retrieval of either or both of sparse and dense vectors. Sparse vectors can be stored using an optimized array-based structure, while dense vectors use a proximity map to calculate distances between information items. In some examples, there are two different vector stores: one for sparse vectors and one for dense vectors.

In some embodiments, the system uses approximate nearest neighbor (AkNN) search for efficient retrieval of both vector types, supporting hybrid searches with either separate sparse and dense indexes or combined distance calculations.

The vector store can also implement clustering-based indexing to optimize search performance, balancing search accuracy and speed.

The vector indexing and organization enable rapid searching of stored embeddings and efficient handling of large volumes of high-dimensional data, ensuring scalability.

Query processing supports fast, accurate querying of stored vectors, combining keyword-based and semantic search methods for relevant business entity retrieval.

Entity resolution matches entities by using indexed embeddings, ensuring that related entities are identified and matched based on both exact keyword matches and semantic relationships.

These components allow the system to handle large-scale, high-dimensional data while providing precise querying capabilities and optimizing vector operations for efficient processing and retrieval.

The embedding models generate two types of vectors: sparse (optimized for keyword matching via BM25) and dense (capturing semantic relationships using Word2Vec).

Sparse vectors retain high dimensionality and are stored as (value, index) pairs for efficient searching. The dense vectors are stored to support hybrid search and capture semantic relationships.

For hybrid search performance, in some embodiments, the system combines BM25 encoding with Reciprocal Rank Fusion (RRF) scoring, balancing precise term matching with semantic understanding for efficient indexing and retrieval.

The hybrid search architecture can be implemented to support multiple approaches for combining keyword-based and semantic searches. For example, it can be implemented in two implementation methods: parallel and sequential.

In the parallel implementation, the system conducts keyword-based and semantic searches simultaneously against the vector store. For each entity record in the database, a combined relevance score is calculated by applying weighted scores: one for the keyword search (e.g., 0.75 weight) and one for the semantic search (e.g., 0.25 weight). These weighted scores are then merged into a final relevance metric for each candidate, and results are ranked based on this combined relevance score.

In the sequential implementation, the system first executes either the keyword-based or semantic search. Initial results are retrieved using the first search method. The second search method is then applied to further refine the candidate pool. A selection module combines and ranks the results from both searches, and final candidates are selected based on predetermined ranking metrics.

The system dynamically determines whether to use the parallel or sequential approach based on several factors, including available computational resources, the size of the vector database being searched, the complexity of the query, and specific business use case requirements.

Both implementation methods utilize the same underlying vector embeddings, which include sparse vectors optimized for keyword matching using BM25 encoding and dense vectors capturing semantic relationships via Word2Vec. The vector store supports the efficient retrieval of both types of embeddings.

To ensure consistent accuracy across different approaches, the hybrid search component applies unified scoring mechanisms for combining keyword and semantic relevance, standardized confidence thresholds for candidate selection, and consistent re-ranking procedures for the final result ordering.

Figure 6:
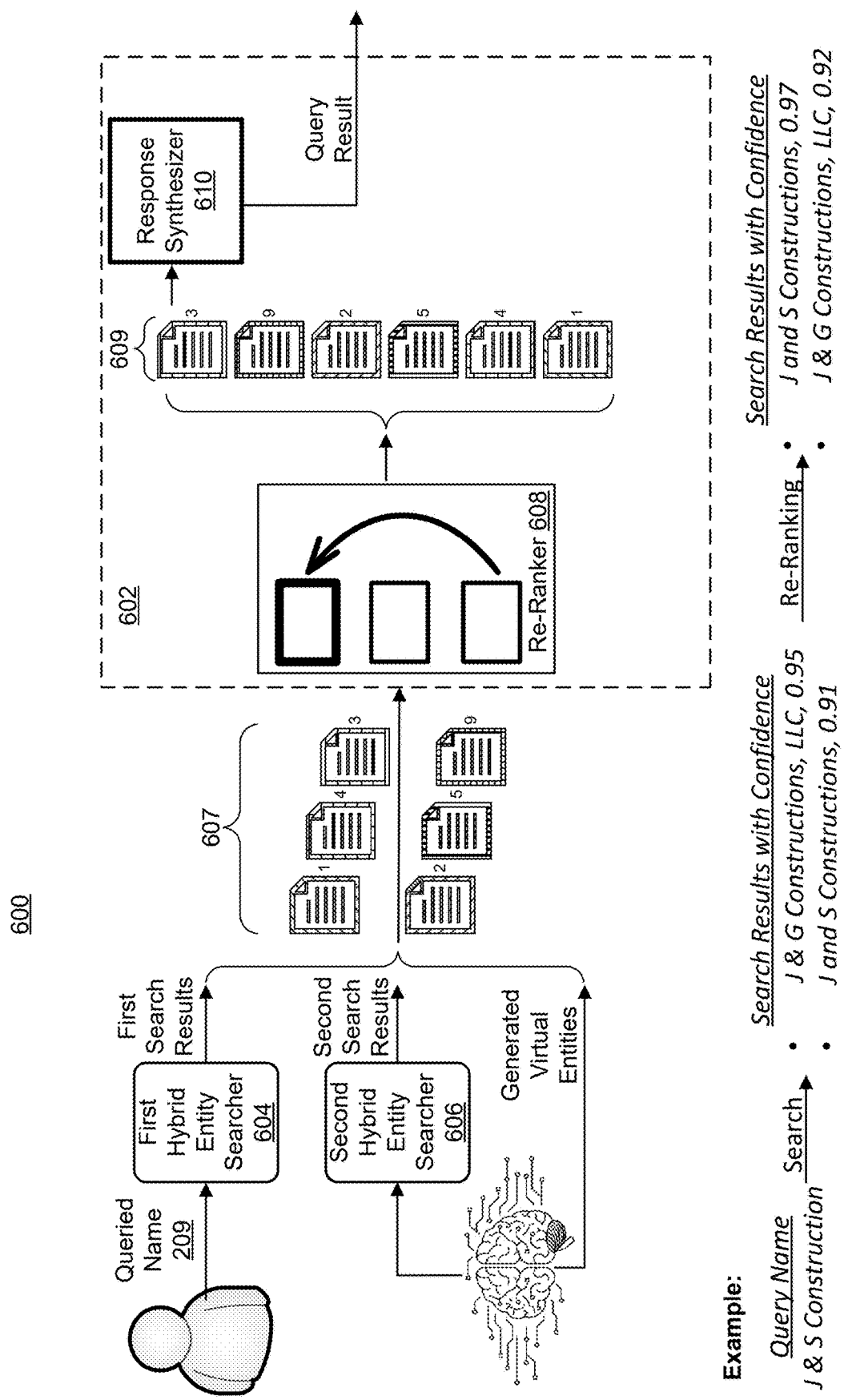
FIG. 6 illustrates a post-processing architecture according to an example embodiment.

FIG. 6 illustrates a post-processing architecture (600) according to an example embodiment. The post-processing architecture (600) includes the hybrid search architecture (500) described above in connection with FIG. 5, and a post-processor (602) configured to process entity search results (607) according to an example embodiment. The post-processing architecture (600) includes a first hybrid entity searcher (604) configured to receive a queried name (209) and generate first search results, and a second hybrid entity searcher (606) configured to receive generated entities and generate second search results.

A post-processor (602) includes a re-ranker (608) configured to receive the first search results and second search results from the first hybrid entity searcher (604) and the second hybrid entity searcher (606), correspondingly, where the re-ranker (608) is configured to re-evaluate and order the entity search results (607) (i.e., retrieved entities) from the first search results and the second search results based on their relevance to the original query. In some embodiments, the re-ranker (608) implements algorithms configured to calculate relevance scores between the queried name and each retrieved entity, where the re-ranker (608) produces an ordered list of entities (609) ranked from highest to lowest relevance.

In some embodiments, the post-processor (602) additionally includes a response synthesizer (610) configured to receive the re-ranked results from the re-ranker (608), where the response synthesizer (610) is configured to generate a final output (e.g., "query result") containing the most relevant entity information. The response synthesizer (610) ensures precise and contextually appropriate information by prioritizing the most relevant and informative entities identified during the re-ranking phase.

In an example implementation, the re-ranker employs a machine learning model trained on historical entity matching data to evaluate candidate relevance. The model considers multiple factors including:
  Direct similarity between input query and candidate entities using, e.g., Jaro-Winkler distance metrics.
  Historical matching performance based on previously validated entity resolutions
  Contextual relevance derived from external data sources including business registries and industry databases
  Entity relationship patterns identified through semantic analysis The machine learning model is periodically retrained using validated match results to improve accuracy over time. The model outputs a composite relevance score that combines these multiple signals to produce the final ranking order In operation, the post-processing architecture (600) overcomes limitations of initial retrieval methods by applying more sophisticated analysis algorithms to refine and improve the quality of results, wherein the module effectively combines hybrid search capabilities with advanced re-ranking to produce optimized entity matches.

FIG. 6 also illustrates an example query using query name "J&S Construction", its search results and confidence score, and the search results with confidence re-ranked.

In an example implementation, the system provides a configurable interface that allows users to customize the number of ranked entity candidates returned in search results. Through the user device interface set (104) described below, users can:
  Set the desired number (N) of top-ranked candidates to return
  Adjust the number of candidates based on specific use cases or application requirements
  Save preferred configuration settings for future searches
  View detailed ranking information for each returned candidate The interface provides validation to ensure N remains within system-defined operational limits while maintaining performance and accuracy. Default settings are optimized based on empirical testing, though users can modify these based on their specific needs.

In some embodiments, the re-ranker (608) evaluates entity candidates using multiple predefined ranking criteria beyond basic similarity matching:
  Business name pattern matching scores that consider industry-specific naming conventions.
  Geographic proximity and jurisdictional relevance when location data is available
  Entity size and market presence indicators from authoritative business databases.
  Temporal relevance based on recent business activity and registration status
  Parent-subsidiary relationship strength when corporate hierarchy information exists.
  Industry classification alignment between query and candidate entities.
  Source reliability weights based on data provider quality metrics Each criterion is assigned configurable weights in the final ranking calculation, allowing the system to optimize rankings for different business contexts and use cases. The weighting scheme is periodically adjusted based on feedback from validated matches to improve ranking accuracy.

In an example implementation the hybrid search system employs a configurable weighted scoring mechanism to integrate keyword-based and semantic search results. For each entity record, a combined relevance score is calculated using a weighted sum formula: $S=(w_k \times K)+(w_s \times M)$, where $w_k$ represents the weight assigned to keyword-based similarity (e.g., 0.75), K is the keyword similarity score, $w_s$ is the weight for semantic similarity (e.g., 0.25), and M is the semantic similarity score.

For example, if an entity record has a keyword similarity score of 0.9 and a semantic similarity score of 0.5, the combined weighted score is computed as:

$$(0.75 \times 0.9)+(0.25 \times 0.5)=0.8 (0.75 \times 0.9)+(0.25 \times 0.5)=0.8.$$

The weighting factors are optimized based on various considerations, including the entity type and industry context, the quality of available entity information, historical matching performance, and specific business requirements.

To improve consistency, both keyword and semantic similarity scores can be normalized to a range of [0, 1]. Keyword scores are derived from BM25 sparse vector matching, while semantic scores are computed using Word2Vec dense vector similarity. This normalization ensures that the final weighted scores maintain a consistent scale for threshold evaluation.

The system allows for dynamic weight adjustment based on ongoing performance monitoring, feedback from validated entity resolutions, and periodic retraining with expanded matching datasets.

To accommodate different implementation needs, the system offers flexibility in how scores are computed and applied. It supports parallel computation of both keyword and semantic similarity scores, sequential refinement of initial search results, configurable minimum thresholds for each score type, and customizable weighting schemes tailored to specific entity categories.

Figure 7:
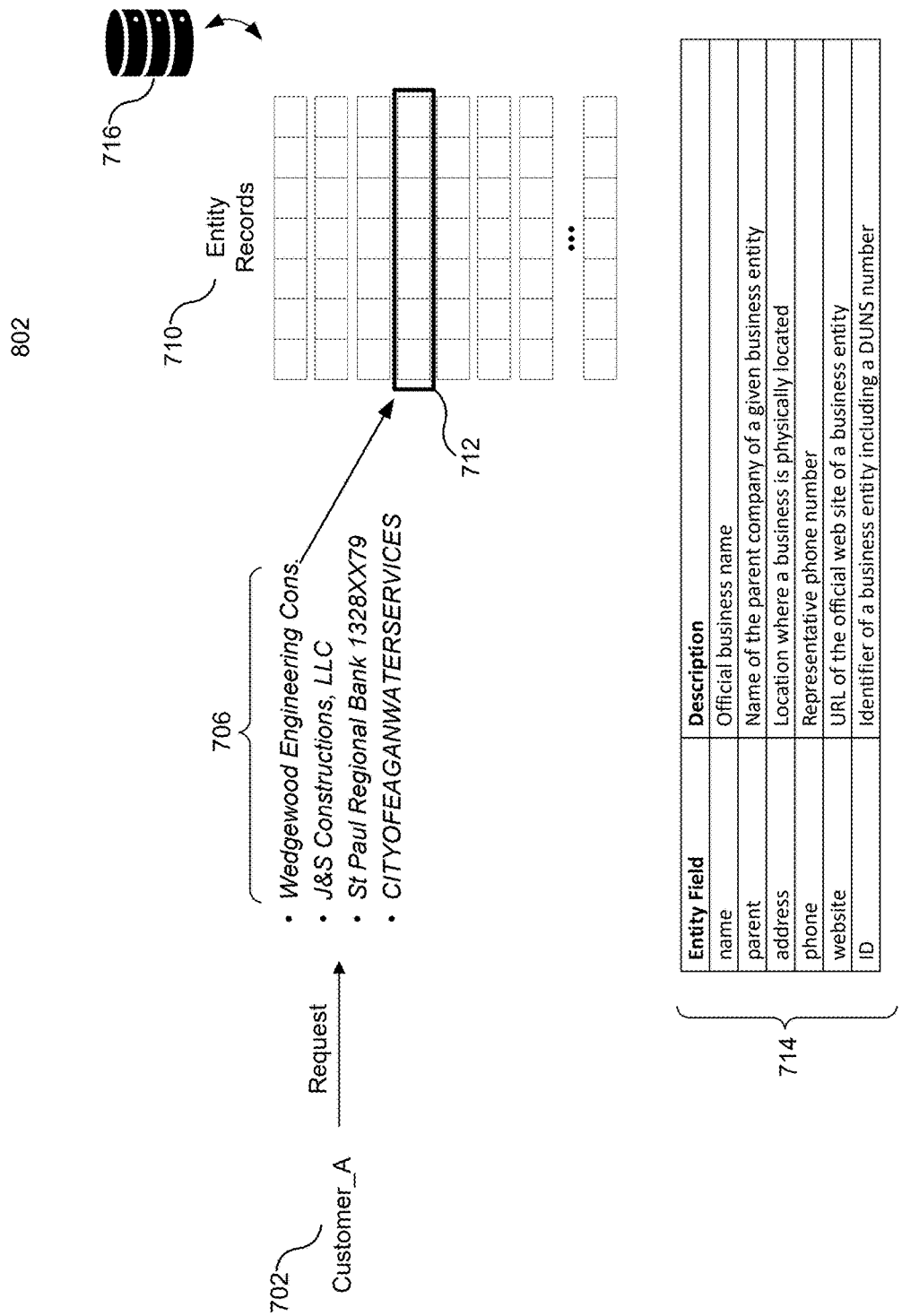
FIG. 7 illustrates entity records and how queried names from requests are processed and matched against datasets according to the example embodiments described herein.

FIG. 7 illustrates entity records and how queried names from requests are processed and matched against datasets according to the example embodiments described herein. As shown in FIG. 7, transaction names (706) such "Wedgewood Engineering Cons.", "J&S Constructions, LLC", "St Paul Regional Bank 1328XX79", and "CITYOFEAGANWATERSERVICES" are included in the request. As illustrated, the request data contains noisy information.

Entity records (710) are stored in a vector store (716), which facilitates efficient retrieval and matching. An entity table (714) defines entity fields and their descriptions, which may be used when comparing against one or more datasets. In an example entity table (714) that is returned to a requestor, key fields include:

name: Official business name parent: Name of the parent company address: Physical business location phone: Representative phone number website: Official website URL ID: Business identifier including DUNS number As shown in FIG. 7, the transaction name "Wedgewood Engineering Cons." matches one of the entity records (710) stored in vector store (716), particularly entity records (712). Other names in transaction names (706) may also match other entity records (710) in vector store (716), but for illustration only one match is shown.

Figure 8:
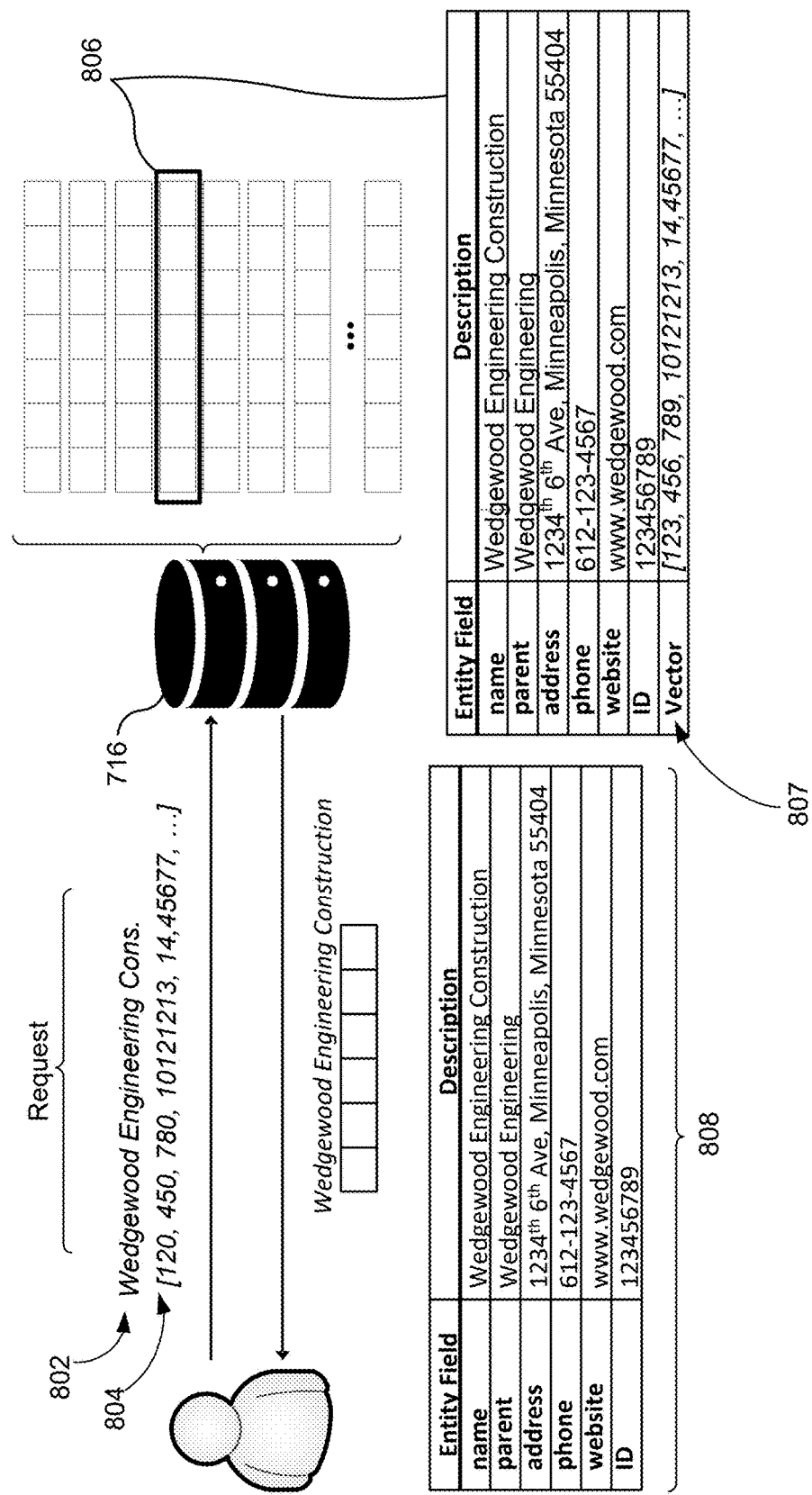
FIG. 8 illustrates a query to a vector store using a hybrid search according to an example embodiment.

FIG. 8 illustrates a query to a vector store (716) using a hybrid search according to an example embodiment. As illustrated by FIG. 8 an example request containing incomplete entity names (802) along with an embedding vector (804). The example request includes both textual data (e.g., "Wedgewood Engineering Cons." (802)) and embedding vector data (e.g., "[120, 450, 780, 10121213, 14,45677, . . . ] (804)").

The embedding vector (804) is generated by the system using embedding models such as the embedding models (304) as described herein. In some embodiments, the embedding vector (804) is generated by using the dense embedding model and sparse embedding model, as described herein. In this example use case, the input retrieved from the request is associated with a wire transaction (e.g., in an ACH wire message) for Customer_A (FIG. 7, 702).

The entity names (802) can be processed while preserving stop words (such as "and", "of") which are used for accurate name matching of short business names. The system can handle various input challenges, including:

Abbreviated names (e.g., "Cons." vs "Consultants")·

Names without spaces (e.g., "CITYOFEAGANWATERSERVICES")·

Names with reference numbers (e.g., "1328XX79")

Names with different formatting of conjunctions (e.g., "J&S" vs "J and S")

Referring still to FIG. 8 the vector store (716) is queried according to the hybrid search discussed above, for example, in connection with FIG. 5. The hybrid search returns one or more entity records (806). In this example use case, only one entity record (806) is returned. The example entity record (806) retrieved from vector store (716) contains detailed business information for "Wedgewood Engineering Construction" with the following fields:

name: Wedgewood Engineering Construction parent: Wedgewood Engineering address: 1234th 6th Ave, Minneapolis, Minnesota 55404 phone: 612-123-4567 website: www.wedgewood.com

ID: 123456789

Vector: [123, 456, 789, 10121213, 14,45677, . . . ] (highlighted as (807))

In turn, the vector field (807) of the retrieved one or more entity records (806) is removed. The resulting entity record (808) is, in turn, sent to the device of the user.

In another example implementation, there are plural (e.g., two) datasets provided by vendors, which contain the name and relevant information of the business entities across various jurisdiction, e.g., North America, Europe, and other continents. A first dataset may contain over X business entities (e.g., 1 million), while the second contains Y business entities (e.g., 4 million). Each of the datasets has its unique features. In an example use case, each dataset is searched using the same input names from transaction information (e.g., a wire transaction, such as an automated clearing house (ACH) transaction).

For searching effectiveness and efficiency, the two datasets are loaded into vector stores respectively. Stop words like "a", "the", "and", "of", . . . , are removed by default. This is useful when dealing with content that contains long texts such as paragraphs and articles. In an example use case, the name strings for the (e.g., business) entities are short. In such cases, the stop words in the name strings are no longer meaningless and they play an essential role to improve search accuracy. In some embodiments, the two datasets are loaded into the vector stores, and the stop words in the name strings are kept.

When searching against each of the two datasets, only matching candidates are returned if they satisfy a predefined similarity threshold (e.g., greater than 0.9, where the similarity score ranges from 0.0 to 1.0). The higher the score, the more similar between the input name and the returned candidates. The predefined threshold could be other values like 0.85 or 0.95 depending on the business scenarios. With the same threshold, multiple candidates could be returned. For example, with the input name string Wedgewood Engineering Cons., two candidate names may be relevant, as follows:

Wedgewood Engineering Consultants

Wedgewood Engineering Construction, LLC

The number of candidates for each input name string when searching against each of the two datasets can be limited to a predetermined number of candidates, e.g., to 3. The predetermined number of candidates for each input name using our own ranking mechanisms as the in-house built ranking functions may better fit the business needs and scenarios. For example, using an input string "J&S Constructions, LLC", illustrates why the re-ranking described herein is a necessary step. When a search against the datasets is performed, two candidates might be returned, such as:

J and S Constructions

J & G Constructions, LLC

The second candidate may have a higher similarity score than the first one. However, the first candidate may be a true match of the input string. The re-ranking procedure described herein re-calibrates the similarities so that a true match will not be missed. After the re-ranking process, a final candidate will be selected for the input name string. It may be the case that no candidates are returned from the two datasets. This is likely as the input names could be truncations, abbreviations, noises, or typos. For example, the last token of the name string St Paul Regional Bank 1328XX79 in the initial transaction input could be a wire transfer reference number. Even though the datasets may contain a business name like "Saint Paul Regional Bank", the searching process against the vector stores might not be able to pass the predefined threshold due to 1) the abbreviation St vs Saint and 2) the noisy information 1328XX79 in the initial transaction input. In this case, an LLM is leveraged to return a desired matching candidate name to us. To get reliable matching name candidates via the LLM, clear and effective instructions to be fed to the LLM. FIG. 9 illustrates an example of a prompt (902) according to an example embodiment. The prompt (902) illustrated in FIG. 9 is an example instruction input into the LLM to determine the steps for the virtual entity generation process, as explained below. In an example implementation, the LLM can be informed that the input name string could be no space between the tokens like the example CITYOFEAGANWATERSERVICES listed above, truncations, abbreviations, noises, or typos. Therefore, the first step of the LLM is to normalize the input strings by reintroducing spaces where appropriate, and considering truncations, abbreviations including single letter initials, noises, and typos. The normalized names by the LLM can be requested to resemble typical business name structures. The LLM, in turn, is prompted to use the normalized input names to search against reliable sources such as official websites, government databases, or business directories. The LLM prioritizes sources that are authoritative and up to date, and not do make up any information. Finally, the LLM will return the most likely official business names. If there are multiple potential matches, the LLM and be requested to return the top N most likely candidates. The quantity N could be any reasonable integers. In an example implementation, N is equal to 3. The LLM can also be requested to provide a confidence value ranging from 0.0 to 1.0 for each returned candidate. The higher the value, the more confidence the LLM has on the returned candidate.

The implementations of the LLM inherit some degree of randomness, that is, with the same input name and the same setting of the LLM, each run might generate slightly different outputs. To take account of the randomness, for each input name, the LLM can be run M times each time with different randomness settings. The quantity M could be any reasonable integer. In an example implementation, M equals to 5. Therefore, for each input name, up to 3*5=15 matching candidates can be generated, which may contain duplicated names. In some embodiments, the LLM can generate X number of candidates. In an example the LLM is not run once to obtain n candidates, (where n is an integer, e.g., 15). Instead, the LLM is run m times (where m is an integer, e.g., 5), each time generating y candidates with different randomness settings (where y is a integer, e.g., 3). This allows the LLM to have more opportunities to explore broader knowledge domains. The re-ranking function described above can be run again with the n (e.g., 15) candidates and select the best candidate as the final matching result to the input name. The procedure described above returns the following matching result for the input string St Paul Regional Bank 1328XX79:

Saint Paul Regional Bank
and returns the following name string for the input CITYOFEAGANWATERSERVICES:

Water Services Center, City of Eagan, MN

Besides the name output, the LLM can be guided to provide associated information of the same business entity, such as address, phone, website, etc. The returned name is then used by the LLM to search against the plural (e.g., two datasets described above) to determine if any potential matches are found in this subsequent iteration. By leveraging its powerful natural language comprehension capabilities, the LLM implementations can be characterized as refinements of the raw input names. The refined names will have a better chance to find matches in the two datasets. Even though there was abbreviation and noise in the input string St Paul Regional Bank 1328XX79, the LLM procedure described above was able to return a proper name Saint Paul Regional Bank. With this refined format, the corresponding name and the associated business entity can be found in the plural (e.g., two) datasets.

"CITYOFEAGANWATERSERVICES" has no spaces between tokens and position shifts of the tokens. This renders it very challenging for the classical matching techniques to find correct matches. The same LLM procedure was able to return a proper candidate Water Services Center, City of Eagan, MN. This refined name can be easily found in the two datasets. When using the refined name to search against the two datasets, we still get up to y (e.g., 3) candidates returned from each of the two datasets. We then apply the re-ranking functions to pick the best one out of the y (e.g., 3) candidates as the final match. In addition, since the procedure provides relevant information of the names such as address, phone, and website, we can cross reference that with the matched name in the datasets as it has similar associated features as well. If the cross-reference matches or is close enough, there is further confidence on the returned names from the LLM procedure and the two datasets. Using the refined names by the LLM to search against the datasets and find matches out of the datasets is useful for ensuring the LLM procedure does not make up information and provides reliable information. By doing so, a safety layer is added to the LLM procedures.

In some cases, it is possible that the (e.g., two) datasets may not contain all the business entities around the world. Occasionally, it may not be possible to find any matches out of the datasets using the refined names by the LLM. When the refined names cannot be verified by the datasets, in some embodiments, they are retained as the final matching result of the raw input names. For these unverifiable matching names, the LLM is then asked to provide a brief description of the associated business entities so that the analysts may have a good understanding about the matching outputs. The business descriptions could be added to the verifiable names as well.

Computing Environment

Figure 10:
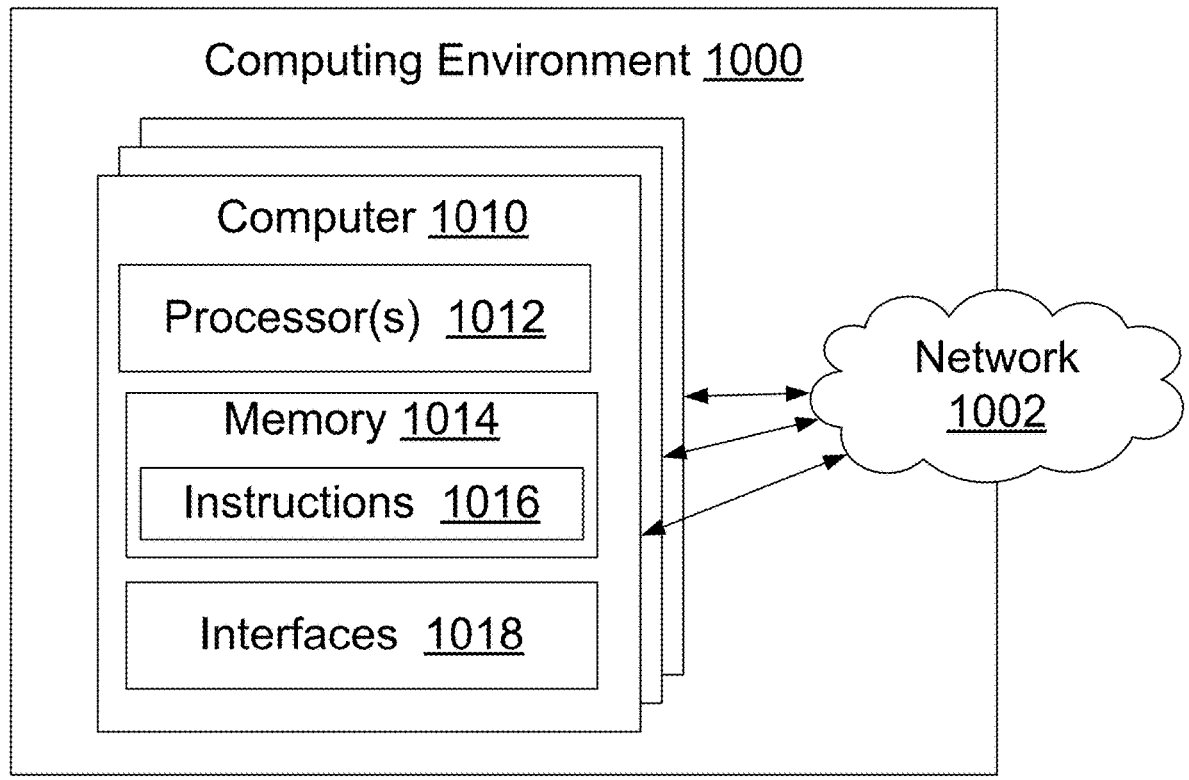
FIG. 10 illustrates a computing environment with which aspects may be implemented.

FIG. 10 discloses a computing environment (1000) in which aspects of the present disclosure may be implemented. A computing environment (1000) is a set of one or more virtual or physical computers (1010) that individually or in cooperation achieve tasks, such as implementing one or more aspects described herein. The computers (1010) have components that cooperate to cause output based on input. Example computers (1010) include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, the computing environment (1000) includes at least one physical computer.

The computing environment (1000) may specifically be used to implement one or more aspects described herein. In some examples, one or more of the computers (1010) may be implemented as a user device, such as mobile device and others of the computers (1010) may be used to implement aspects of a machine learning framework useable to train and deploy models exposed to the mobile device or provide other functionality, such as through exposed application programming interfaces.

The computing environment (1000) can be arranged in any of a variety of ways. The computers (1010) can be local to or remote from other computers (1010) of the environment (1000). The computing environment (1000) can include computers (1010) arranged according to client-server models, peer-to-peer models, edge computing models, other models, or combinations thereof.

In many examples, the computers (1010) are communicatively coupled with devices internal or external to the computing environment (1000) via a network (1002). The network (1002) is a set of devices that facilitate communication from a sender to a destination, such as by implementing communication protocols. Example networks (1002) include local area networks, wide area networks, intranets, or the Internet.

In some implementations, computers (1010) can be general-purpose computing devices (e.g., consumer computing devices). In some instances, via hardware or software configuration, computers (1010) can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use. Such relatively low powered device may nonetheless be specially configured for such inference tasks so that it performs inference faster or more efficiently than a standard desktop or laptop computer.

Many example computers (1010) include a processor set (1012), a memory set (1014), and an interface set (1018). Such components can be virtual, physical, or combinations thereof.

The processor set (1012) is a set of one or more processors. Processors are components that execute instructions, such as instructions that obtain data, process the data, and provide output based on the processing. The processor set (1012) often (collectively or individually) obtain instructions and data stored by the memory set (1014). The processors of the processor set (1012) can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the processor set (1012) includes at least one physical processor implemented as an electrical circuit. Example providers or designers of processors (1012) include INTEL, AMD, QUALCOMM, TEXAS INSTRUMENTS, and APPLE.

The memory set (1014) is a collection of components configured to store instructions (1016) and data for later retrieval and use. The instructions (1016) can, when executed by one or more processors of processor set (1012), cause execution of one or more operations that implement aspects described herein. In many examples, the memory (1014) is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, the memory set (1014) can include transitory memory that stores information encoded in transient signals.

The interface set (1018) is a set of one or more components that facilitate receiving input from and providing output to something external to the computer (1010), such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The interfaces set (1018) can include one or more components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces (1018) can facilitate connection of the computing environment (1000) to a network (1002).

The computers (1010) can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT or other flagship models (GPT-4o, o1, o3, or others as released) by OPENAI, a LLAMA model by META, a CLAUDE model by ANTHROPIC, a GEMINI model by GOOGLE, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Application of Techniques

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for resolving entities, comprising:
a processor set comprising one or more processors;
a memory set storing instructions that, when executed by one or more processors of the processor set, cause the processor set to operate as:
an index builder configured to generate and store a plurality of sparse vector embeddings and a plurality of dense vector embeddings representing entity information from input data;
a query component configured to retrieve entity candidates from the stored plurality of sparse vector embeddings and the plurality of dense vector embeddings using a hybrid search that combines a keyword-based search method and a semantic search method;
a virtual entity generator configured to use a large language model to generate a plurality of virtual entities containing synthesized attributes corresponding to entity candidates based on the input data when high-confidence matches are not identified in the hybrid search performed by the query component, wherein synthesized attributes are generated by processing the input data to create structured entity information that includes information not present in the input data; and
a re-ranker configured to order entity candidates retrieved based on relevance to the input data.

2. The system of claim 1, wherein the plurality of sparse vector embeddings are generated using a keyword-based embedding model and the plurality of dense vector embeddings are generated using a semantic embedding model.

3. The system of claim 1, wherein the query component is further configured to perform the hybrid search using a predetermined confidence threshold associated with the hybrid search to determine if additional virtual entity generation is necessary when high-confidence matches are not found.

4. The system of claim 3, wherein the predetermined confidence threshold is set to a predetermined range, and when no entity candidates pass the predetermined confidence threshold, the virtual entity generator is invoked to synthesize new candidates.

5. The system of claim 3, wherein the predetermined confidence threshold is set to an optimal value obtained through experiments and experience.

6. The system of claim 1, wherein the re-ranker uses a machine learning model to assess the relevance of the retrieved entity candidates based on similarity to any one or a combination of: input data, historical matching performance, and external data sources.

7. The system of claim 1, wherein the hybrid search performs:
a keyword-based search to generate keyword-based search results;
a semantic search to generate semantic search results;
combines the keyword-based search results and the semantic search results to form combined search results; and
ranks the combined search results to form a plurality of ranked results; and
selects a predetermined number of the plurality of ranked search results.

8. The system of claim 1, wherein the virtual entity generator includes a process for:
generating a prompt to instruct the LLM to generate virtual entities, wherein the generating includes normalizing input data by reintroducing spaces, correcting abbreviations, and eliminating noise or typographical errors.

9. The system of claim 7, wherein the virtual entity generator uses a natural language processing (NLP) model to perform normalization, and the NLP model is configured to detect truncations, single-letter initials, and common abbreviations specific to business names.

10. The system of claim 1, wherein the entity candidates retrieved from the hybrid search are filtered based on a second predefined threshold score for candidate relevance before being passed to the re-ranker.

11. The system of claim 7, wherein the virtual entity generator determines when the high-confidence matches are identified by determining whether the search results meet a predetermined confidence score threshold value.

12. The system of claim 1, wherein the re-ranker is further configured to return multiple entity candidates ranked to generate a plurality of candidates, and the final candidate is selected from the top N candidates, where N is configurable via an interface by a system user.

13. The system of claim 12, wherein the multiple entity candidates are ranked by similarity or other predefined criteria.

14. The system of claim 1, wherein the index builder is further configured to:
preserve stop words in the entity information during vector embedding generation to maintain accuracy in matching short business names.

15. The system of claim 1, wherein the virtual entity generator is configured to:
execute multiple iterations of entity generation using the large language model with different randomness settings to explore broader knowledge domains for entity matching.

16. The system of claim 15, wherein the virtual entity generator:
generates a predetermined number of candidate entities per iteration; and
applies the re-ranking to the combined set of generated candidates to select a final matching result.

17. The system of claim 1, wherein the system is configured to:
cross-reference generated entity information against matched entities in vendor datasets to verify accuracy of the virtual entity generator output.

18. The system of claim 1, wherein the virtual entity generator is configured to:
provide associated business entity information including address, phone number, website URL, and business identifiers for generated virtual entities.

19. The system of claim 1, wherein the hybrid search implements a weighted scoring system that:
assigns configurable weights to keyword search scores and semantic search scores;
combines the weighted scores to generate a final relevance metric for each candidate; and
dynamically adjusts weights based on entity type and matching performance.

* * * * *